United States Patent
Oakley et al.

(10) Patent No.: US 7,343,032 B2
(45) Date of Patent: Mar. 11, 2008

(54) METHOD AND APPARATUS FOR AUTOMATIC AND DYNAMIC VESSEL DETECTION

(75) Inventors: Jonathan David Oakley, Sunnyvale, CA (US); Daniel Russakoff, Mountain View, CA (US); Akira Hasegawa, Saratoga, CA (US)

(73) Assignee: Fujifilm Corporation, Tokyo (JP)

( * ) Notice: Subject to any disclaimer, the term of this patent is extended or adjusted under 35 U.S.C. 154(b) by 342 days.

(21) Appl. No.: 11/216,152

(22) Filed: Sep. 1, 2005

(65) Prior Publication Data

US 2007/0047787 A1    Mar. 1, 2007

(51) Int. Cl.
*G06K 9/00* (2006.01)
(52) U.S. Cl. .................................... 382/128
(58) Field of Classification Search .............. 382/190, 382/199, 128–134, 155–160, 236, 259, 107; 600/443, 425, 407, 479, 300; 345/443; 348/65; 707/1–5
See application file for complete search history.

(56) References Cited

U.S. PATENT DOCUMENTS

| | | | | |
|---|---|---|---|---|
| 4,692,864 | A | 9/1987 | Shimoni et al. ............ | 600/443 |
| 5,148,809 | A | 9/1992 | Biegeleisen-Knight et al. ............ | 600/443 |
| 5,285,786 | A | 2/1994 | Fujii ............ | 600/425 |
| 5,384,905 | A | 1/1995 | Tanaka et al. ............ | 345/443 |
| 5,768,405 | A | 6/1998 | Makram-Ebeid ............ | 382/128 |
| 5,872,861 | A | 2/1999 | Makram-Ebeid ............ | 382/130 |
| 5,940,538 | A | 8/1999 | Spiegel et al. ............ | 382/236 |
| 6,053,865 | A * | 4/2000 | Sugiyama et al. ............ | 600/300 |
| 6,134,353 | A | 10/2000 | Makram-Ebeid ............ | 382/259 |
| 6,195,445 | B1 | 2/2001 | Dubuisson-Jolly et al. | 382/107 |
| 6,690,816 | B2 | 2/2004 | Aylward et al. ............ | 382/128 |
| 6,718,193 | B2 | 4/2004 | Knoplioch et al. .......... | 600/407 |
| 6,728,407 | B1 | 4/2004 | Horiuchi et al. ............ | 382/199 |

OTHER PUBLICATIONS

Sun, Ying, "Automated Identification of Vessel Contours in Coronary Arteriograms by an Adaptive Tracking Algorithm," *IEEE Transactions on Medical Imaging*, vol. 8, No. 1, Mar. 1989, pp. 78-88.
Pinz et al., "Mapping the Human Retina," *IEEE Transactions on Medical Imaging*, vol. 17, No. 4, Aug. 1998, pp. 606-619.
Frangi et al., "Multiscale Vessel Enhancement Filtering," *Proceedings from the First International Conference on Medical Image Computing and Computer-Assisted Intervention*, Oct. 11-13, 1998, pp. 130-137.
Zwiggelaar et al., "The Benefit of Knowing Your Linear Structures in Mammographic Images," *Medical Image Understanding and Applications*, Conference Publication, 2002.
Vermeer et al., "A Model Based Method for Retinal Blood Vessel Detection," *Computers in Biology and Medicine*, vol. 34, 2004, pp. 209-219.

* cited by examiner

*Primary Examiner*—Ishrat Sherali
(74) *Attorney, Agent, or Firm*—Birch, Stewart, Kolasch & Birch, LLP

(57) ABSTRACT

A method and an apparatus automatically detect vessels in a diagnostic image. The method according to one embodiment accesses digital image data representing a diagnostic image; detects vessel candidates in the diagnostic image by processing the diagnostic image data, the step of detecting vessel candidates including identifying edge pixel pairs of vessels in a diagnostic image by iteratively adjusting a plurality of constraints relating to a general direction and shape of a vessel for a next iteration of edge pixel pair identification in a diagnostic image; and determines whether the plurality of edge pixel pairs form a vessel using learned features.

22 Claims, 17 Drawing Sheets

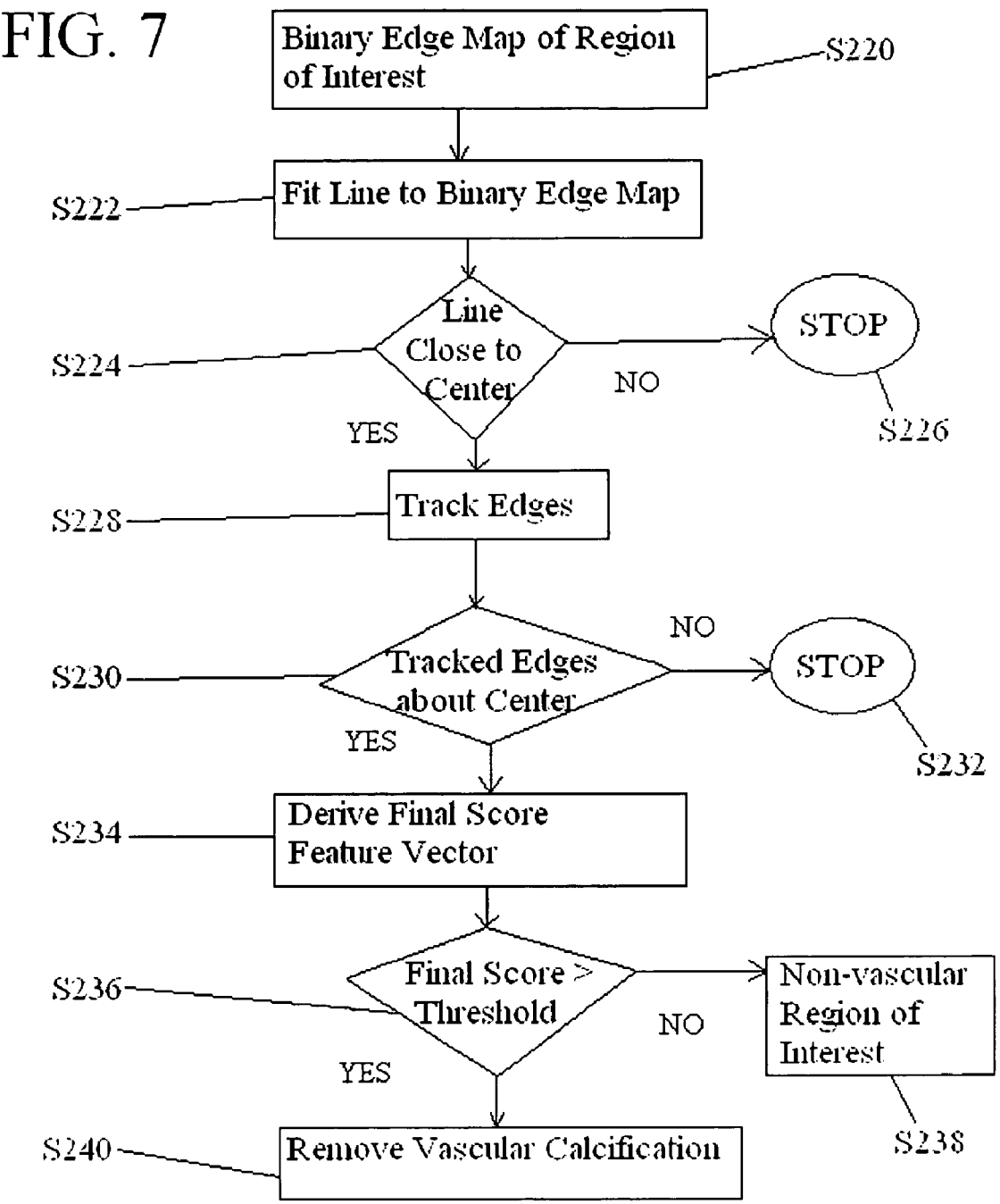

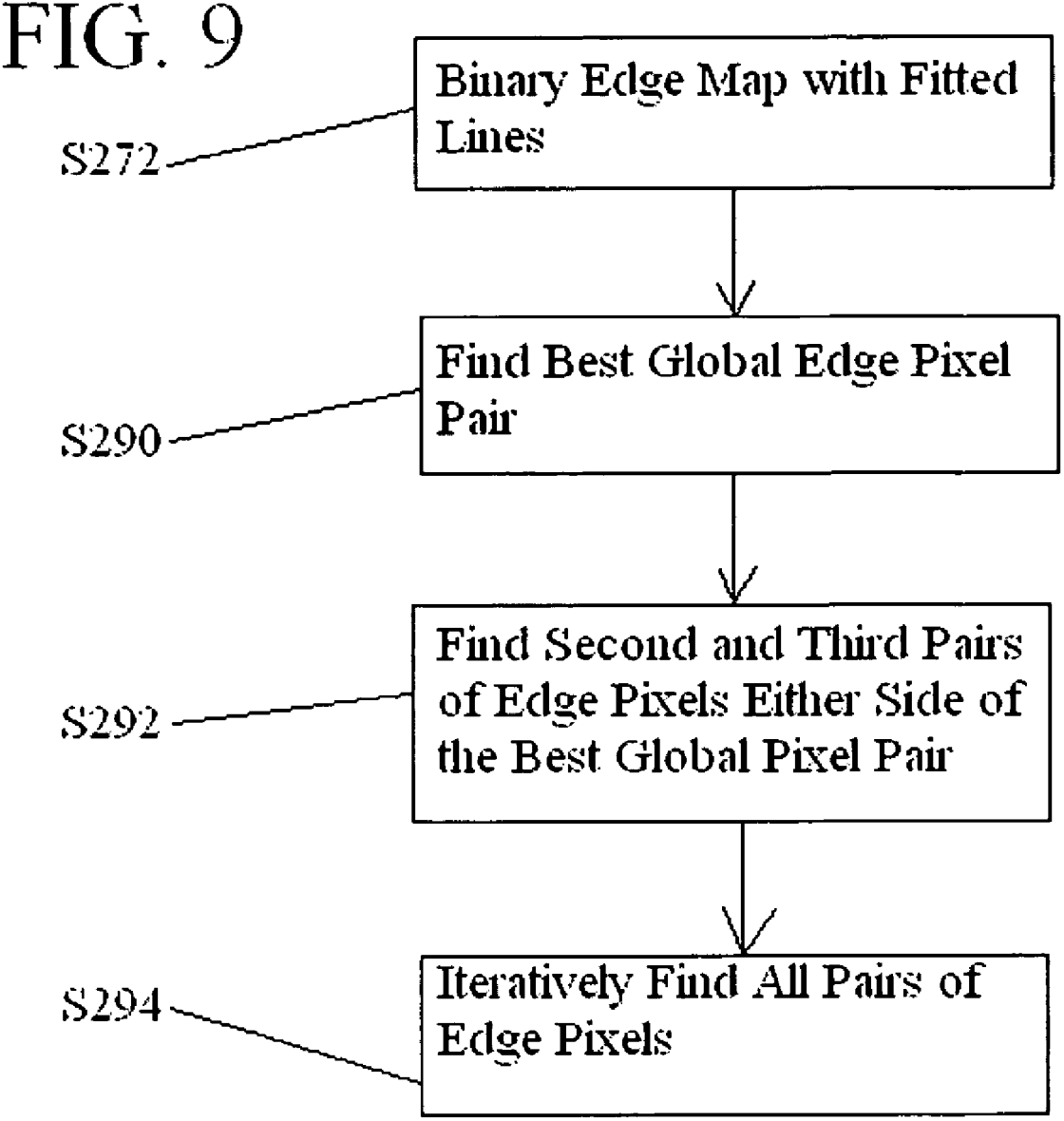

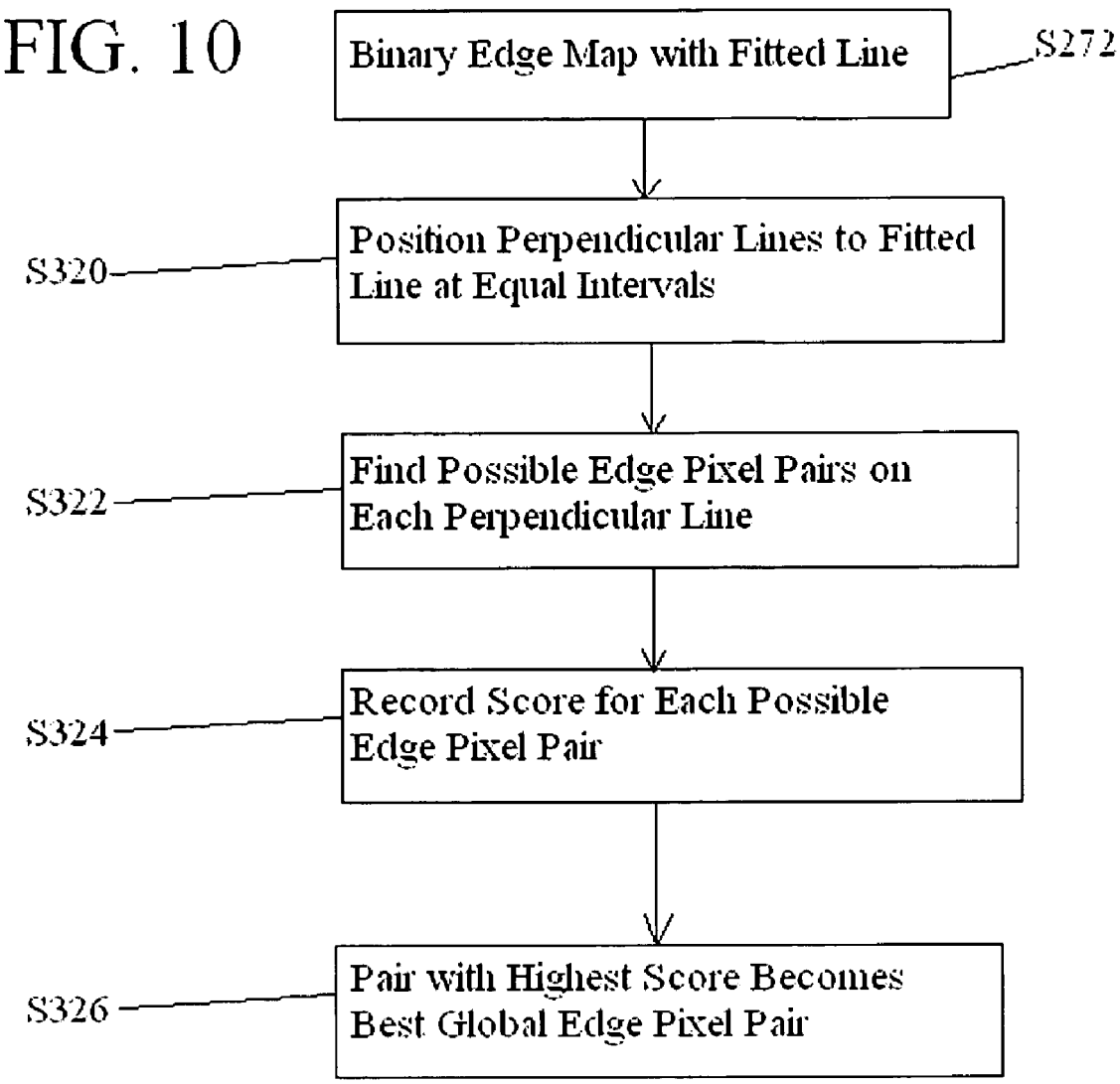

FIG. 14A
FIG. 14B
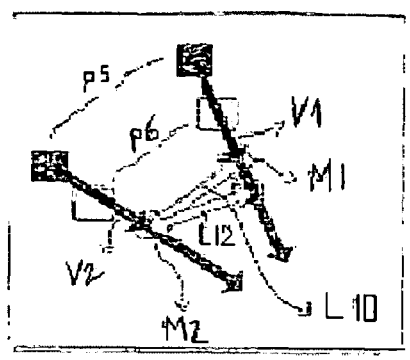
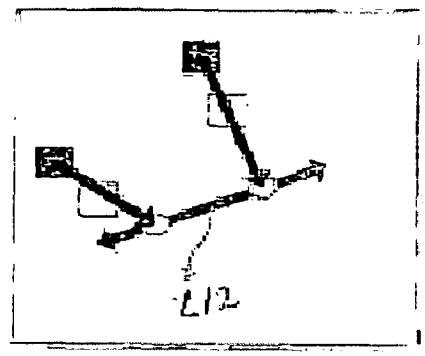
FIG. 14C
FIG. 14D
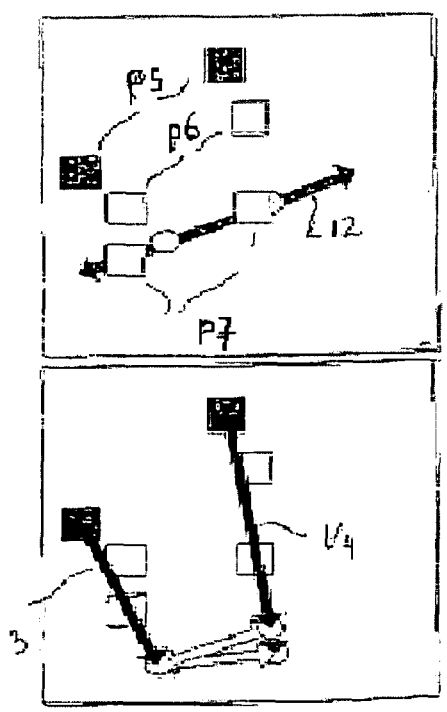
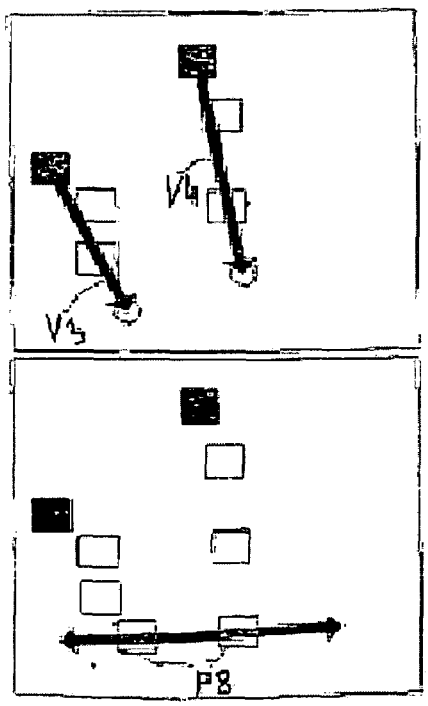
FIG. 14E
FIG. 14F

L530

L532

L534

METHOD AND APPARATUS FOR AUTOMATIC AND DYNAMIC VESSEL DETECTION

BACKGROUND OF THE INVENTION

1. Field of the Invention

The present invention relates to a digital image processing technique, and more particularly to a method and apparatus for detecting vessels in a diagnostic image.

2. Description of the Related Art

Medical problems can be diagnosed from mammography images by recognizing and detecting microcalcifications. A key problem with the aforementioned methodology is the large number of false positives (FPs) that occur in vascular regions as the sensitivity of the calcification detection algorithm is increased. An example of an FP is a vascular region mistakenly identified as a microcalcification. Such large number of FPs occurs because the calcification detection algorithm is easily confused by high frequency structure of vessels present in mammography images. An additional challenge to accurate detection and recognition of calcifications is the fact that signals generated by isolated calcifications are similar to signals generated by vessels. Since calcifications located within vessels are benign and therefore of no interest, an automated detection system that identifies calcifications in mammography images must identify vascular regions as well. An automated calcification detection system should therefore contain a module that identifies vascular regions and then rules out vascular FP finds. Additional modules in the automated detection system will identify FPs from other sources. The result is a calcification detection system that operates at high levels of precision and specificity.

The techniques currently used to detect and/or enhance the appearance of vascular images in retinal images or arteriograms (DSA) do not work for mammography. The general problem with these approaches is that the edge profiles are not always manifested with a strong contrast against the background. Furthermore, in basing edge detection solely on edge derivatives, one is highly susceptible to noise in images leading to non-robust results.

A few publications have studied automated identification of vessel contours. One such technique is described in "Automated Identification of Vessel Contours in Coronary Arteriograms by an Adaptive Tracking Algorithm", *Ying Sun, IEEE Trans. Med. Imag.*, Vol. 8, No. 1 (March 1989). However, with the method described in this work, one will have to manually select a starting point to begin tracking. This makes the detection process semi-automated. Secondly, the use of a matched filter in the above mentioned application to enhance the profile of vessels works only under the assumption of a known structure and scale of vessels, and a low level of image noise. This is unlikely to be the case for mammography images.

Another technique is described in "Mapping the Human Retina", Section 6, Pinz et al., *IEEE Trans. Medical Imaging*, vol. 17, no. 4, pp. 606-619, 1998. In this publication a retinal map is created from scanning laser ophthalmoscope (SLO) images by finding matching edge pairs of vessels. The search range has constraints such as a minimum and maximum width, opposite gradients, and angle between edge pixel pairs. Best pixel pairs are decided based solely upon gradient. Since vessels present in mammography images have discontinuous edges and exhibit high noise, one needs to use additional constraints in edge detection.

SUMMARY OF INVENTION

The present invention is directed to a method and an apparatus for automatically detecting vessels in a diagnostic image. According to a first aspect of the present invention, a method of automatically detecting vessels in a diagnostic image comprises: accessing digital image data representing a diagnostic image; and detecting vessel candidates in the diagnostic image by processing the diagnostic image data. The step of detecting vessel candidates includes: identifying edge pixel pairs of vessels in a diagnostic image, by iteratively adjusting a plurality of constraints relating to a general direction and shape of a vessel for a next iteration of edge pixel pair identification in a diagnostic image; and determining whether the plurality of edge pixel pairs form a vessel, using features learned from previous data.

According to a second aspect of the present invention, an apparatus for automatically detecting vessels in a diagnostic image comprises: an image data unit for providing digital image data representing a diagnostic image; and a vessel candidate detecting unit for detecting vessel candidates in the diagnostic image by processing the diagnostic image data. The vessel candidate detecting unit detects vessel candidates by identifying edge pixel pairs of vessels in the diagnostic image, by iteratively adjusting a plurality of constraints relating to a general direction and shape of a vessel for a next iteration of edge pixel pair identification in the diagnostic image, and determining whether the plurality of edge pixel pairs form a vessel, using features learned from previous data.

BRIEF DESCRIPTION OF THE DRAWINGS

Further aspects and advantages of the present invention will become apparent upon reading the following detailed description in conjunction with the accompanying drawings, in which:

FIG. 7 is a flow diagram illustrating operations performed by a vessel detection unit according to an embodiment of the present invention;

FIG. 9 is a general flow diagram illustrating a technique for tracking edges of vessels using fitted lines in a binary edge map of an image containing vessels according to an embodiment of the present invention;

FIG. 10 is a flow diagram illustrating a technique for finding the best global pixel pair to start tracking of edges of vessels for an image containing vessels according to an embodiment of the present invention;

FIG. 14A-FIG. 14F illustrate aspects of the operation for iteratively and dynamically determining the next pairs of pixels that track edges once the first two pairs are found, without any initial assumptions on the direction and shape of the structure according to an embodiment of the present invention illustrated in FIG. 13;

DETAILED DESCRIPTION

Figure 1:
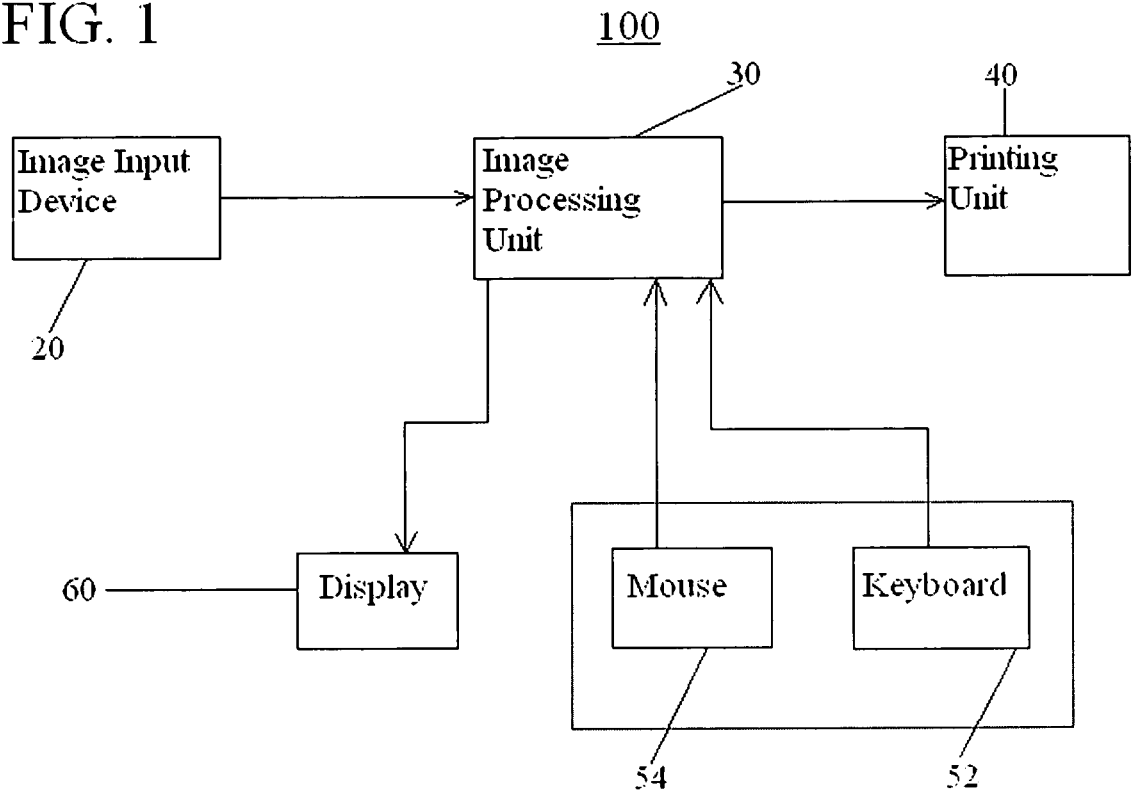
FIG. 1 is a block diagram of a system for automatic and dynamic vessel detection according to an embodiment of the present invention.

Aspects of the invention are more specifically set forth in the accompanying description with reference to the appended figures. FIG. 1 is a block diagram of a system for automatically detecting vessels in a diagnostic image according to an embodiment of the present invention. The system 100 illustrated in FIG. 1 includes the following components: an image input device 20; an image processing unit 30; a printing unit 40; a user input unit 50; and a display 60. Operation of the system in FIG. 1 will become apparent from the following discussion.

The image input device 20 provides digital image data representing a diagnostic image. The image input device 20 may be one or more of any number of devices providing digital image data derived from a radiological film or a digital system. Such an input device may be a scanner for scanning black and white or color images from a film-screen. The input device may be one or more of any number of devices for providing digital data derived from a diagnostic image, e.g., a recording medium (a CD-R, floppy disk, USB drive), or a network connection. The image-processing unit 30 receives digital image data from the image input device 20 and performs automatic detection of vessels in a manner discussed in detail below. A user, e.g., a radiology specialist at a medical facility, may view outputs of image processing unit 30 via display 60 and may input commands to the image processing unit 30 via the user input device 50. In the embodiment illustrated in FIG. 1, the user input device 50 includes a keyboard 52 and a mouse 54. In addition to performing automatic detection of vessels in accordance with embodiments of the present invention, the image processing unit 30 may perform additional image processing functions in accordance with commands received from the user input device 50. The printing unit 40 receives the output of the image processing unit 30 and generates a hard copy of the processed image data. In the environment of a medical facility, the printing unit 40 may take various forms, such as a laser printer. In addition or as an alternative to generating a hard copy of the output of the image processing unit 30, the processed image data may be returned to the patient as an image file, e.g., via a portable recording medium or via a network (not shown).

Figure 2:
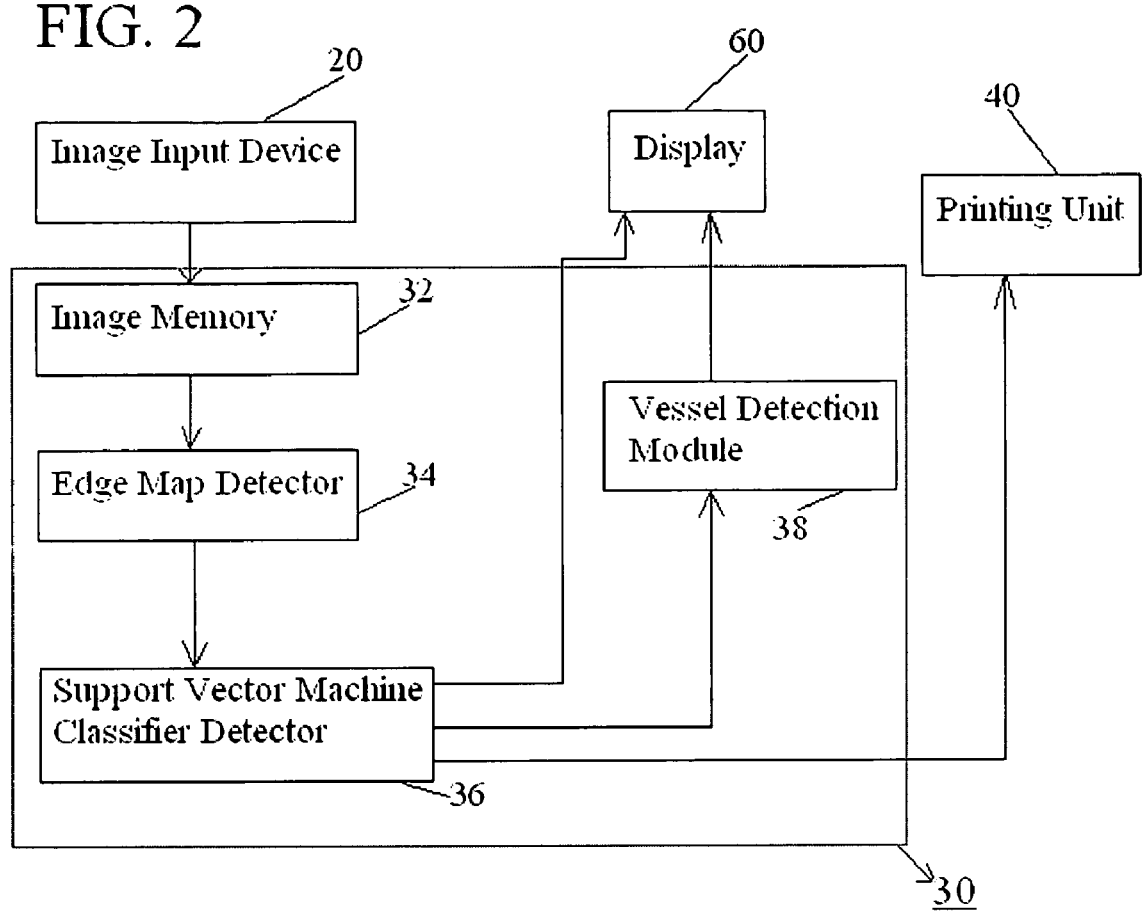
FIG. 2 is a block diagram illustrating in more detail aspects of the image processing unit of the automatic and dynamic vessel detection system illustrated in FIG. 1 according to an embodiment of the present invention.

FIG. 2 illustrates details of the image processing unit 30 for performing automatic vessel detection according to an embodiment of the present invention. As shown in FIG. 2, the image processing unit 30 according to this embodiment includes: an image memory 32, which receives digital image data from the image input device 20; an edge map detector 34; a support vector machine classifier detector 36; and a vessel detection module 38. Although the various components of FIG. 2 are illustrated as discrete elements, such an illustration is for ease of explanation and it should be recognized that certain operations of the various components may be performed by the same physical device, e.g., by one or more microprocessors. Generally, the arrangement of elements for the image processing unit 30 illustrated in FIG. 2 performs edge map detection to generate an edge map of a diagnostic image, support vector machine classification to identify edge map regions that do not contain any vessels, and vessel detection to identify all vessels in the diagnostic image. Operation of the components of the image processing unit 30 illustrated in FIG. 2 will be next described with reference to FIGS. 3-17.

Figure 3:
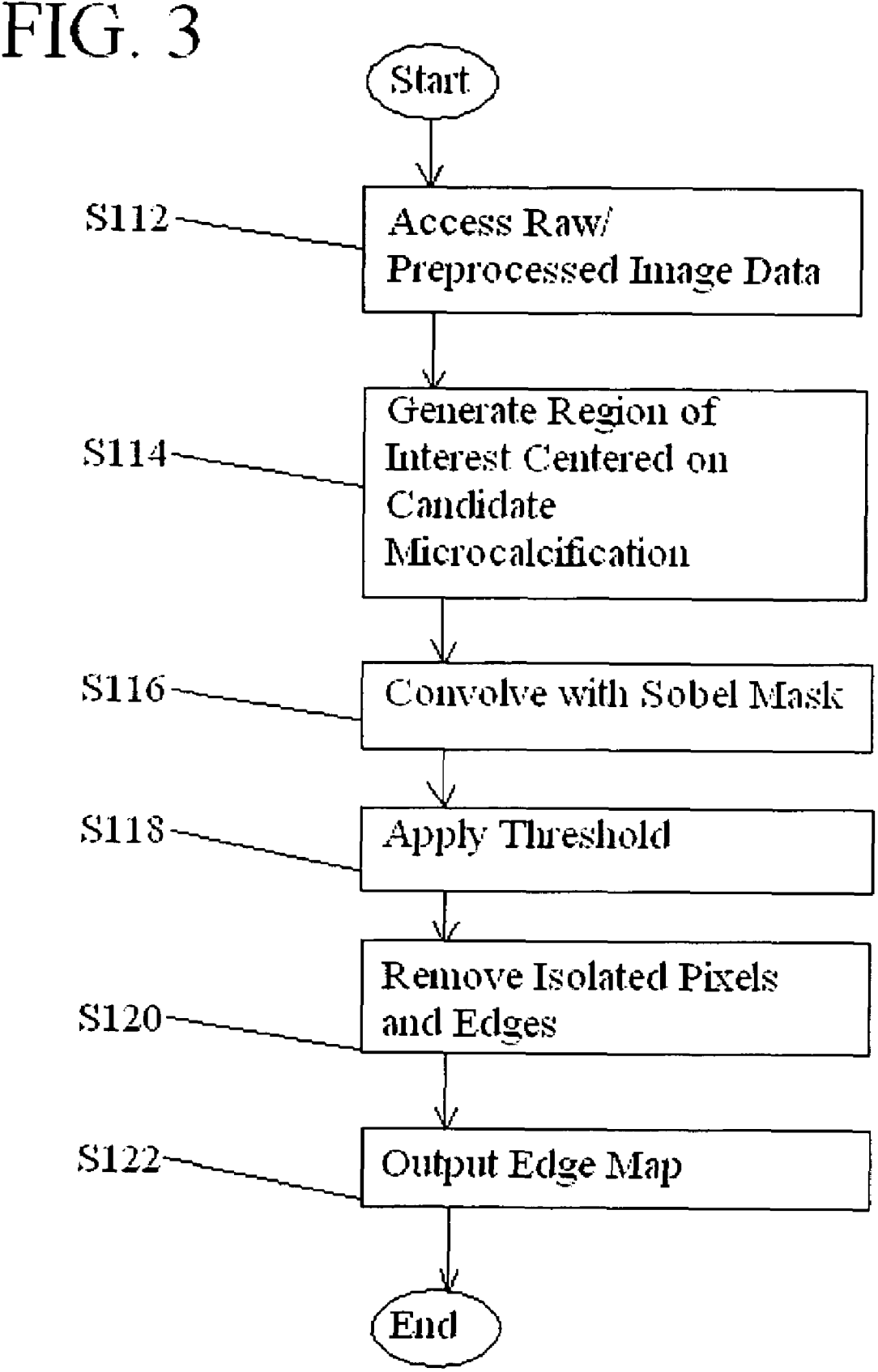
FIG. 3 is a flow diagram illustrating operations performed by an edge map detector unit to generate an edge map of an image containing vessels according to an embodiment of the present invention.

FIG. 3 is a flow diagram illustrating operations performed by the edge map detector 34 in accordance with an embodiment of the present invention. Initially, the edge map detector unit 34 accesses digital image data from the image memory 32 to process the image under consideration (S112). The edge map detector 34 then divides the digital image into regions of interest (ROIs) centered on candidate microcalcifications (S114). A region of interest is large enough to contain sufficient information to identify vessels, yet small enough so that vessels located inside are piecewise linear. Along with some other sizes, 64-by-64 pixel regions of interest satisfy this requirement. Pixel size and resolution in image data determine optimum size of ROIs. An edge operator is applied to each region of interest. A Sobel mask (S116) may be such an edge operator. A threshold is applied to each region of interest convolved with a Sobel mask (S118). The result of the previous step is a binary edge map generated for each region of interest. Isolated pixels and edges are removed from the binary edge map, because such pixels represent noise in the initial digital image (S120). Along with some other methods, one way to identify isolated edges is to select all edges that contain less than 5 connected edge pixels. The resulting binary edge map (S122) is then input into the support vector machine classifier detector 36.

Figure 4A:
FIG. 4A illustrates an exemplary image containing vessels.
Figure 4B:
FIG. 4B illustrates an exemplary result of generating an edge map of an image containing vessels according to the implementation of the present invention illustrated in FIG. 3.
Figure 5:
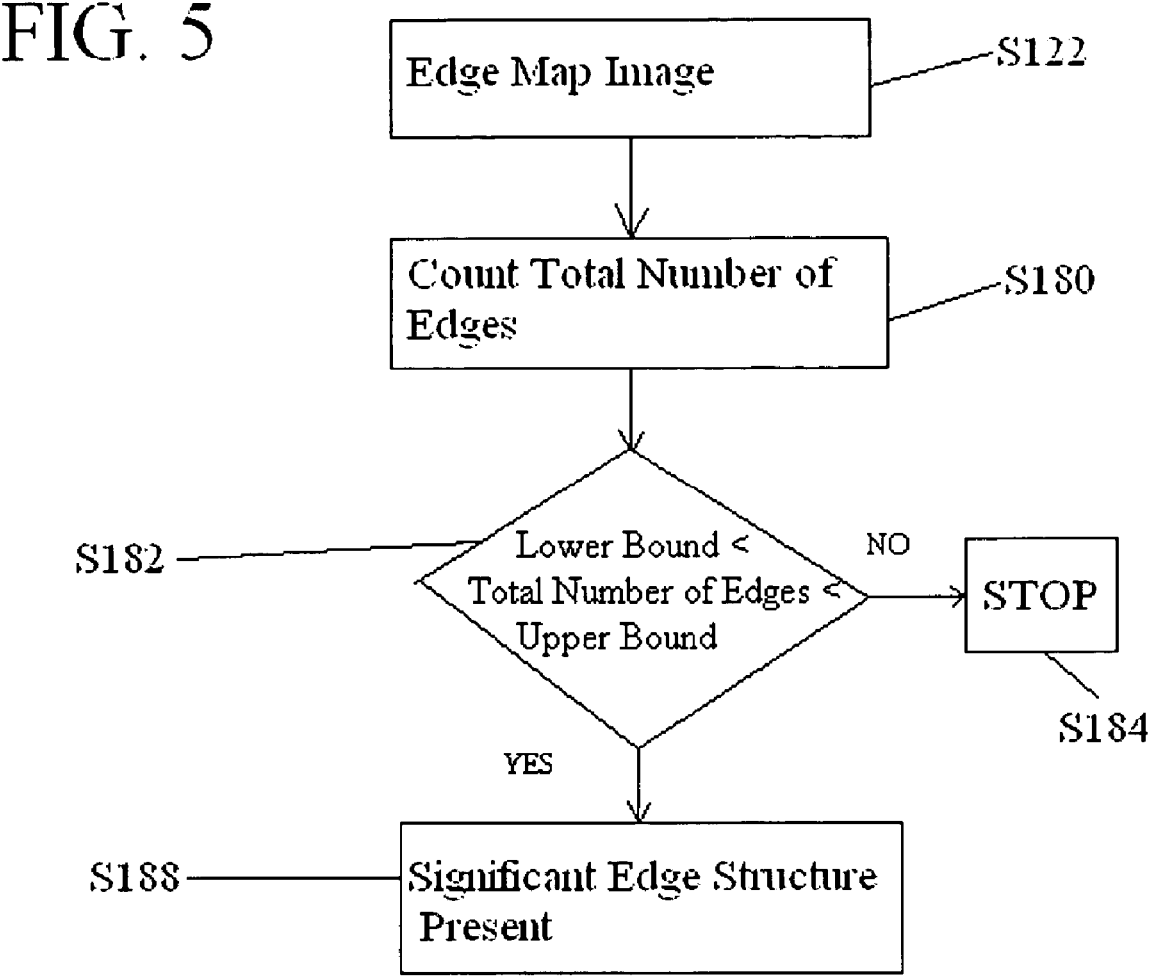
FIG. 5 is a flow diagram illustrating operations performed by a support vector machine classifier detection unit on an edge map to identify image candidates that do not contain any vessels according to an embodiment of the present invention.

FIG. 4A illustrates an exemplary digital image containing vessels, and FIG. 4B illustrates an exemplary result of generating the edge map of the image in FIG. 4A according to the implementation of the present invention illustrated in FIG. 3;

FIG. 5 is a flow diagram illustrating operations performed by the support vector machine classifier detector 36 in accordance with an embodiment of the present invention. The edge map image (S122) is input into the support vector machine classifier detector 36. The support vector machine classifier detector 36 decides whether each region of interest contains at least one vessel. All connected edges in the edge map image are counted (S180). If the total number of edges is too small or too large, the support vector machine classifier detector 36 decides that the region of interest does not contain vessels. Possible upper and lower bounds for total number of edges in a 64-by-64 pixel region of interest are 1200 and 60. A region of interest that does not contain any vessels is not a vascular false positive and is not further processed by the vessel detection module 38 (S184). If the total number of edges in the edge map lies between the above mentioned lower and upper bounds, the support vector machine classifier detector 36 decides that the region of interest contains significant edge structure and therefore has at least one vessel (S188). Such a region of interest is sent to the vessel detection module 38.

Figure 6A:
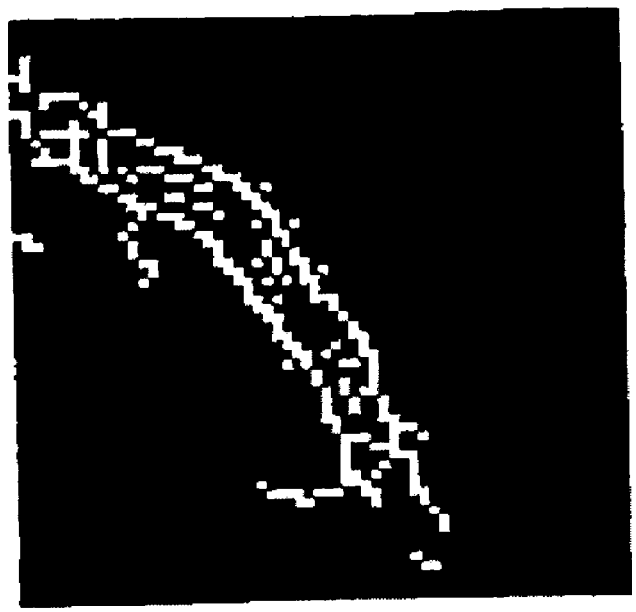
FIG. 6A illustrates an exemplary edge map containing significant edge structure.
Figure 6B:
FIG. 6B illustrates an exemplary edge map image not containing significant edge structure according to the implementation of the present invention illustrated in FIG. 5.

FIG. 6A illustrates an exemplary image containing significant edge structure, which is sent to the vessel detection module 38. FIG. 6B illustrates an exemplary image without significant edge structure, that is not further processed, according to the implementation of the present invention illustrated in FIG. 5;

FIG. 7 is a flow diagram illustrating operations performed by a vessel detection module 38 in accordance with an embodiment of the present invention. A binary edge map of a vascular region of interest is sent from the support vector machine classifier detection unit 36 to the vessel detection unit 38 (S220). A line is fitted to the binary image map in order to estimate directions of vessels inside the edge map (S222). Proximity of the fitted line to center of the region of interest is measured by using a critical distance parameter (S224). Critical distance between a fitted line and center of a region of interest can be roughly estimated as being on the order of magnitude of typical maximum vessel thickness in diagnostic images. If the fitted line in the region of interest is not within critical distance from the center of the region of interest, then no vessel exists that passes through the center of the region of interest. Therefore the region of interest either contains no vessels or contains vessels that do not pass through the candidate microcalcification in the center. Such region of interest is not further processed in the vessel detection module 38 (S226). If the fitted line is within critical distance from the center of the region of interest, the region of interest is sent to the tracking step. The fitted line in the region of interest will be tracked (S228). The outputs of the tracking step are pairs of edges that delineate vessels. A test is performed to decide whether identified vessels pass through the center of the region of interest (S230). If no vessels pass through the center of the region of interest, the region of interest either contains no vessels or contains vessels that do not pass through the center candidate microcalcification. Such region of interest is not further processed in the vessel detection module 38 (S232). If at least one vessel goes through the center of the region of interest, the region of interest is sent to the next step. A final feature vector score for the center-crossing vessel is computed from various characteristics of tracked vessel edges (S234). The feature vector score is then input into a new support vector machine classifier (S236). The support vector machine classifier operates based on a trained ideal threshold value. The training of the support vector machine classifier is done off-line using a number of regions of interest that are either vascular or non-vascular. These regions of interest are manually classified to establish a notion of vascularity or non-vascularity for the support vector machine classifier. The support vector machine classifier is then presented with new example regions that are either vascular or non-vascular, and learns how to establish a threshold and return feature vector scores for example regions to indicate degree of vascularity. When a feature vector score for the center-crossing vessel (S234) is input into the trained support vector machine classifier (S236), the support vector machine classifier compares the feature vector score with the trained ideal threshold value. If the feature vector score for the center-crossing vessel is greater than the threshold value, the region of interest is vascular and therefore a false positive in the context of a calcification detection algorithm. False positives are removed (S240). If the feature vector score for the center-crossing vessel is lower than the threshold value, the region of interest is not vascular. Other modules will then be applied to the non-vascular region of interest to determine if it is indeed a calcification (S238).

Figure 8A:
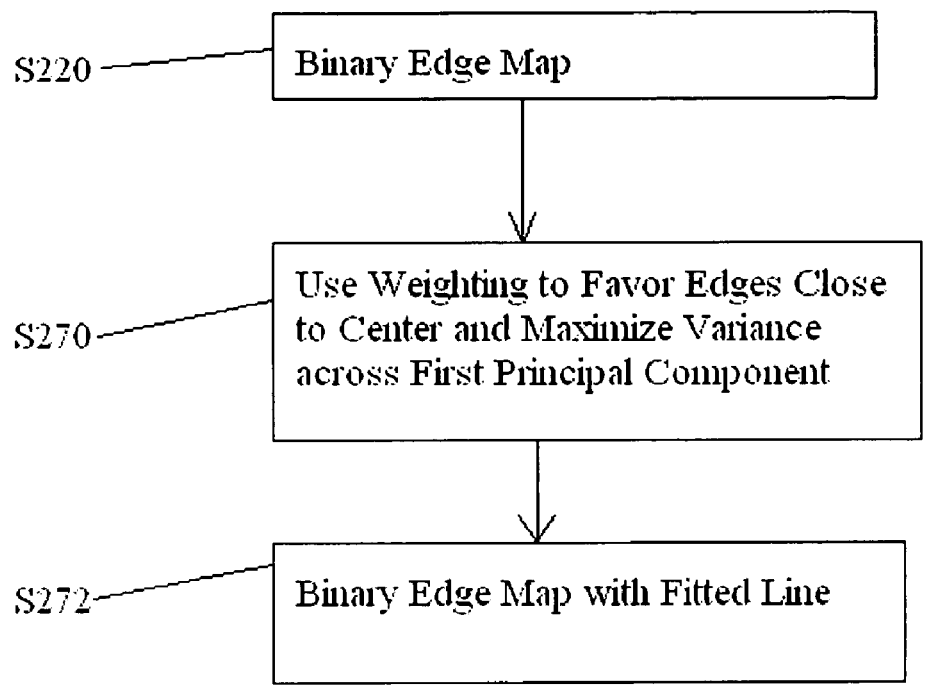
FIG. 8A is a general flow diagram illustrating a technique for fitting a line to a binary edge map of an image containing vessels according to an embodiment of the present invention.

FIG. 8A is a general flow diagram illustrating a technique for fitting lines to a binary edge map of an image. Weighting is used to favor edges close to center of a region of interest. For this purpose, a new edge map data structure that holds all of the binary edge points is created, where each edge may be included more than once. The number of times each edge is included is inversely proportional to the distance between the edge and the center of the region of interest. Hence edges close to center of region of interest carry more weight than edges away from center. The technique then maximizes the variance of the edge map data structure across its first principal component using a single valued decomposition (S270). The output is a binary edge map with a fitted line (S272).

Figure 8B:
FIG. 8B illustrates an exemplary result of fitting a line to a binary edge map of an image containing vessels according to an embodiment of the present invention; illustrated in FIG. 8A.

FIG. 8B illustrates an exemplary result of fitting a line to a binary edge map of an image containing vessels according to an embodiment of the present invention illustrated in FIG. 8A;

FIG. 9 is a flow diagram illustrating operations performed by the line-tracking step of the vessel detection module 38. Given a binary edge map with a fitted line for a region of interest (S272), a search is undertaken in the direction of the fitted line to determine the best global edge pixel pair (S290). Identification of the best global edge pixel pair locates a vessel in the region of interest. The method then iteratively finds edge pixels that delineate the edge walls of vessels using a tracking mechanism. A second edge pair of pixels is found perpendicular to the fitted line using a connectivity constraint placed on this new pair and the best overall edge pixel pair (S292). Once two pairs of edge pixels are identified, the rest of the edge pixel pairs are iteratively found (S294). New edge pixel pairs are found using previous two pairs that were found but skipping the pair before the last found pair.

FIG. 10 is a flow diagram illustrating a technique for finding the best global edge pixel pair to start tracking of edges for an image containing vessels according to an embodiment of the present invention. Perpendicular lines to the fitted line are generated at equal intervals (S320) along the fitted line of a binary edge map (S272). Pairs of pixels most likely to be part of vessel edges are searched along each perpendicular line (S322). An individual score value is assigned to each pixel pair found along perpendicular lines (S324). The score tallies positions, gradients and intensities of the two pixels in each pair within the region of interest. The higher the score, the more likely it is that the pixel pair belongs to vessel edges. The pair with the highest score is selected from among all pixel pairs (S326). This pair is the best overall edge pixel pair.

Figure 11A:
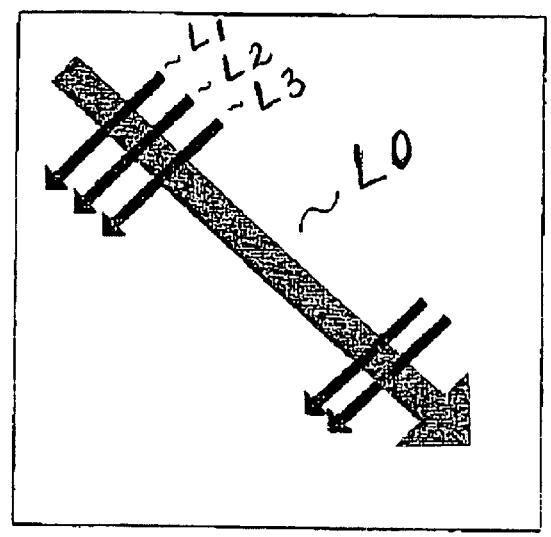
FIG. 11A illustrates aspects of the operation for finding the best global pixel pair to start tracking of edges for an image containing vessels according to an embodiment of the present invention illustrated in FIG. 10.

FIG. 11A illustrates aspects of the operation for finding the best global edge pixel pair to start tracking of edges for an image containing vessels according to an embodiment of the present invention illustrated in FIG. 10. Equidistant perpendicular lines L1, L2, L3 to the fitted line L0 are generated.

Figure 11B:
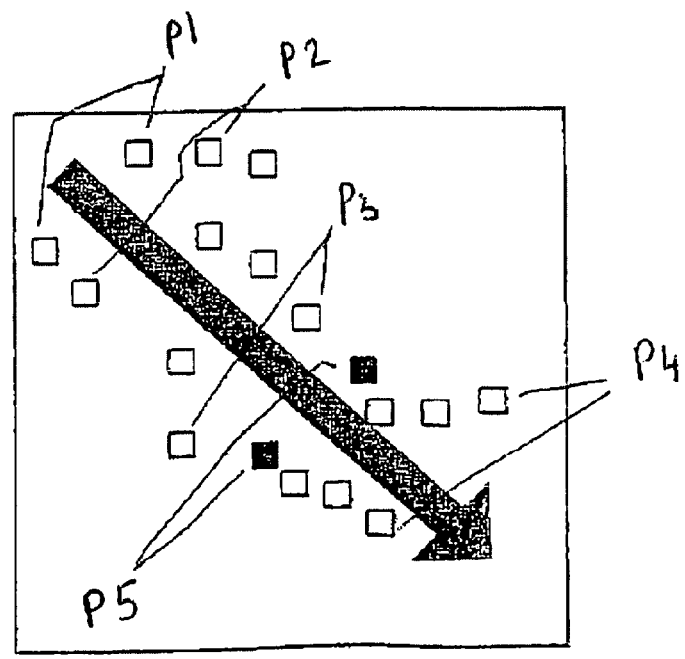
FIG. 11B illustrates aspects of the operation for selecting the best global pixel pair to start tracking of edges for an image containing vessels according to an embodiment of the present invention illustrated in FIG. 10.

FIG. 11B illustrates aspects of the operation for finding the best global edge pixel pair to start tracking of edges for an image containing vessels according to an embodiment of the present invention illustrated in FIG. 10. Pairs of pixels P1, P2, P3, P4 that are likely to be part of edges are found. The best global edge pixel pair is P5.

Figure 12:
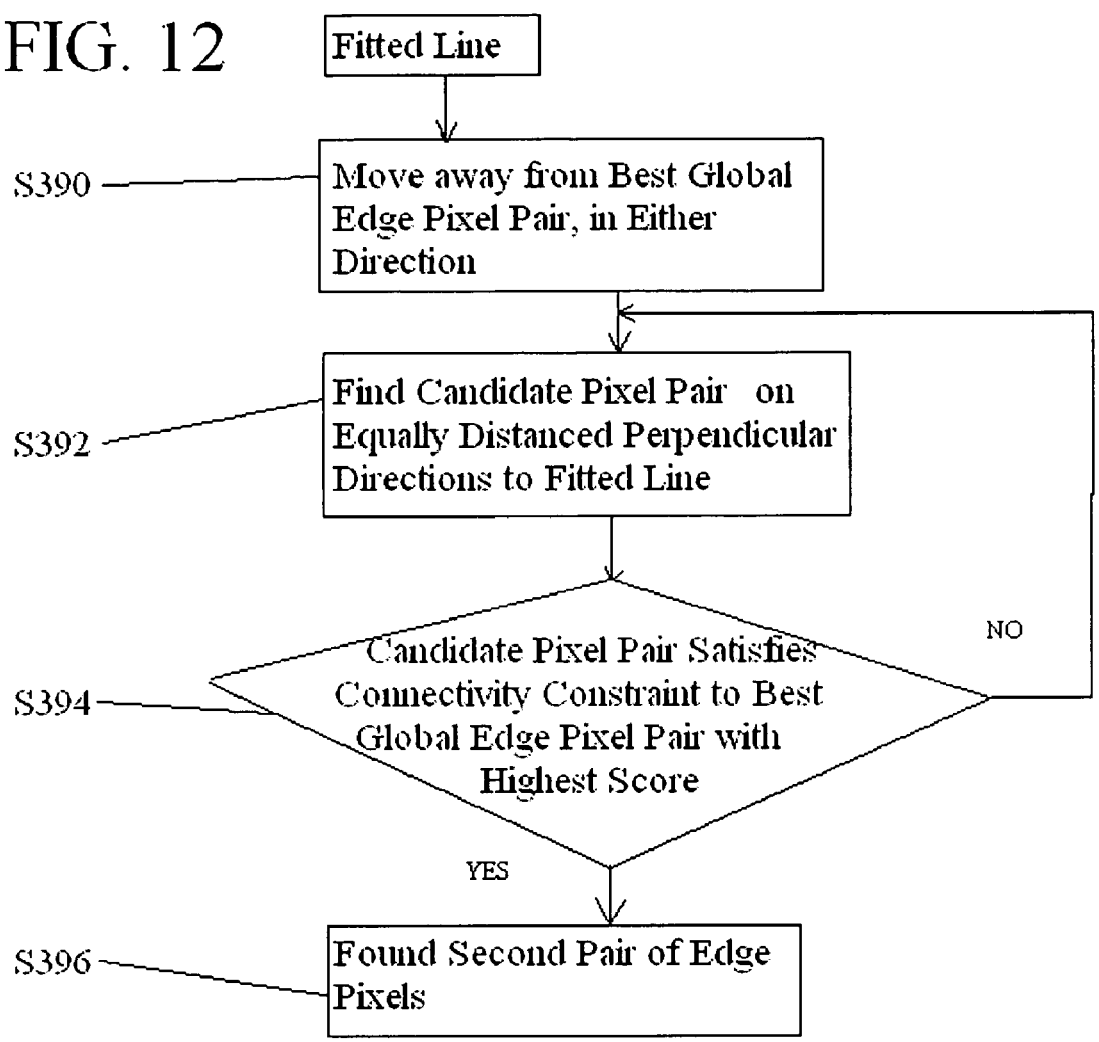
FIG. 12 is a flow diagram illustrating a technique for finding the second best pixel pair adjacent to the best global pixel pair to track the edges of an image containing vessels according to an embodiment of the present invention.

FIG. 12 is a flow diagram illustrating a technique for finding the second best pixel pair adjacent to the best global edge pixel pair to track the edges of an image containing vessels according to an embodiment of the present invention. A search on equally distanced directions perpendicular to the fitted line takes place (S392), while moving away from the best global edge pixel pair in either direction (S390). A connectivity constraint (S394) is placed on the candidate pair and the best global edge pixel pair while searching for the second edge pixel pair. The connectivity constraint is related to the distance between the perpendicular directions to the fitted line and the angle between the best overall edge pixel pair and a candidate pair. Such angle must be less than 90 degrees. The highest connectivity score is awarded to a new pixel pair that makes an angle of 0 degrees with the best global edge pixel pair. The pixel pair with the highest connectivity score becomes the second pair of edge pixels (S396).

Figure 13:
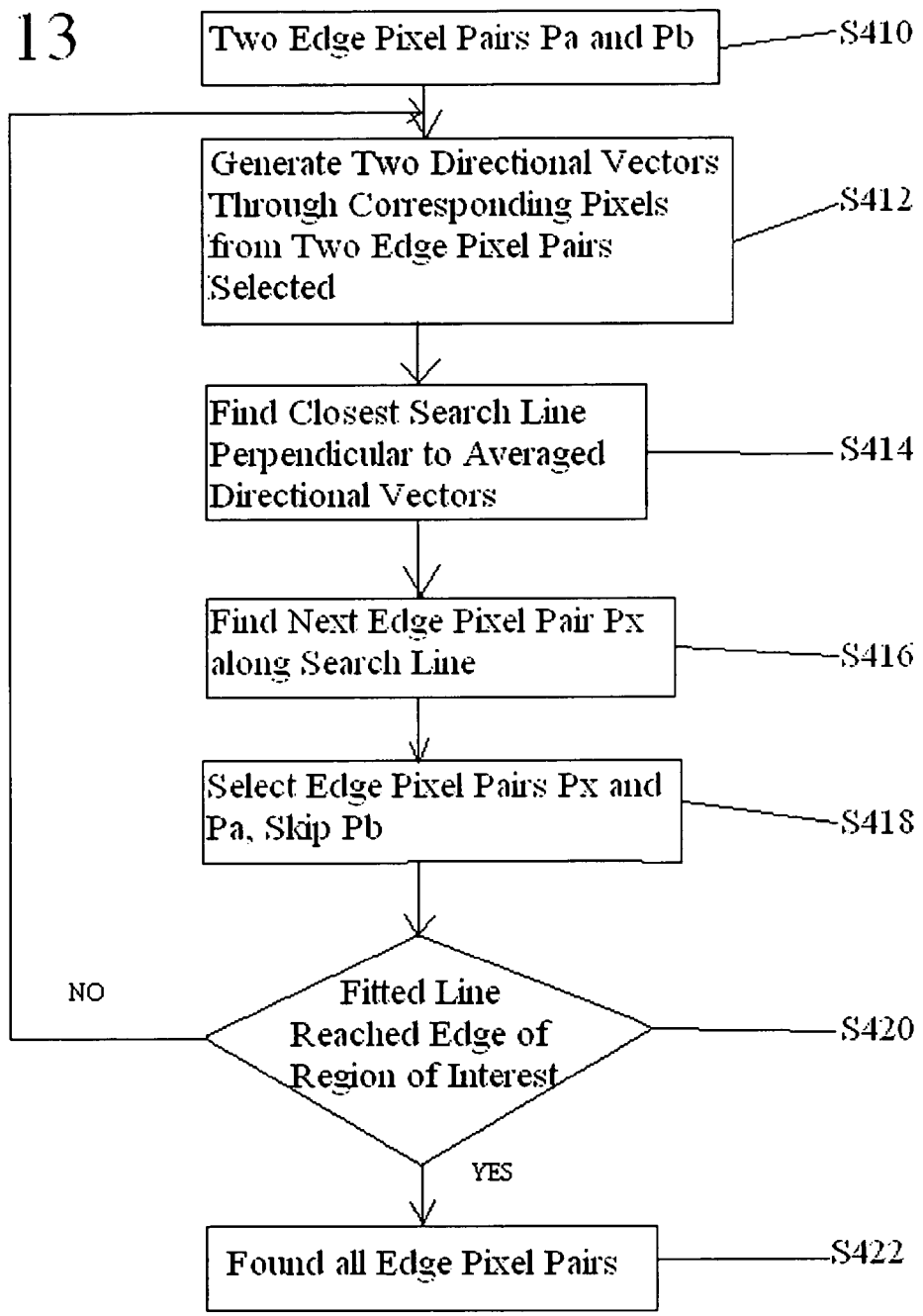
FIG. 13 is a flow diagram illustrating a technique for iteratively and dynamically determining the next pairs of pixels that track edges of vessels once the first two pairs are found, without any initial assumptions on the direction and shape of the structure according to an embodiment of the present invention.

FIG. 13 is a flow diagram illustrating a technique for iteratively and dynamically determining the next pairs of pixels that track edges once the first two pairs are found according to an embodiment of the present invention. The first two edge pixel pairs found (S410) are used to estimate the tracking direction in search of the next edge pixel pair. Two directional vectors are generated from the first two edge pixel pairs (S412). A search line perpendicular to the average of directional vectors is found using a connectivity constraint (S414). After the third edge pixel pair is found along the search line (S416), the technique iteratively continues. The tracking direction of search for each new edge pixel pair is determined by using the last edge pixel pairs found skipping the pair before the last pair found (S418). The search for edge pixel pairs continues until the fitted line reaches the edges of the region of interest (S420).

FIG. 14A-FIG. 14F illustrate aspects of the operation for iteratively and dynamically determining the next pairs of pixels that track edges once the first two pairs are found, without any initial assumptions on the direction and shape of the structure according to an embodiment of the present invention. The best global pixel pair P5 and the second pixel pair P6 adjacent to pair P5 generate two directional vectors V1 and V2. Following directional vectors V1 and V2, two points M1 and M2 are found which define a search line. Points M1 and M2 are two pixels or less away from pair P6. Points M1 and M2 define the search line L1. The search line L10 is not necessarily perpendicular to the vectorial average of vectors V1 and V2. The closest line to L10 that is also perpendicular to the vectorial average of vectors V1 and V2 becomes the new search line L12. The pair of pixels on search line L12 with highest tracking score becomes the next pixel pair P7 to be part of the tracking operation. The tracking score is a weighted sum of parameters that may include edge characteristics, position, connectivity parameters, gradient magnitudes and angles. New directional vectors V3 and V4 are generated from pixel pairs P7 and P5. The process repeats to find the next edge pixel pair P8 to be part of tracking operation, and so on.

Figure 15:
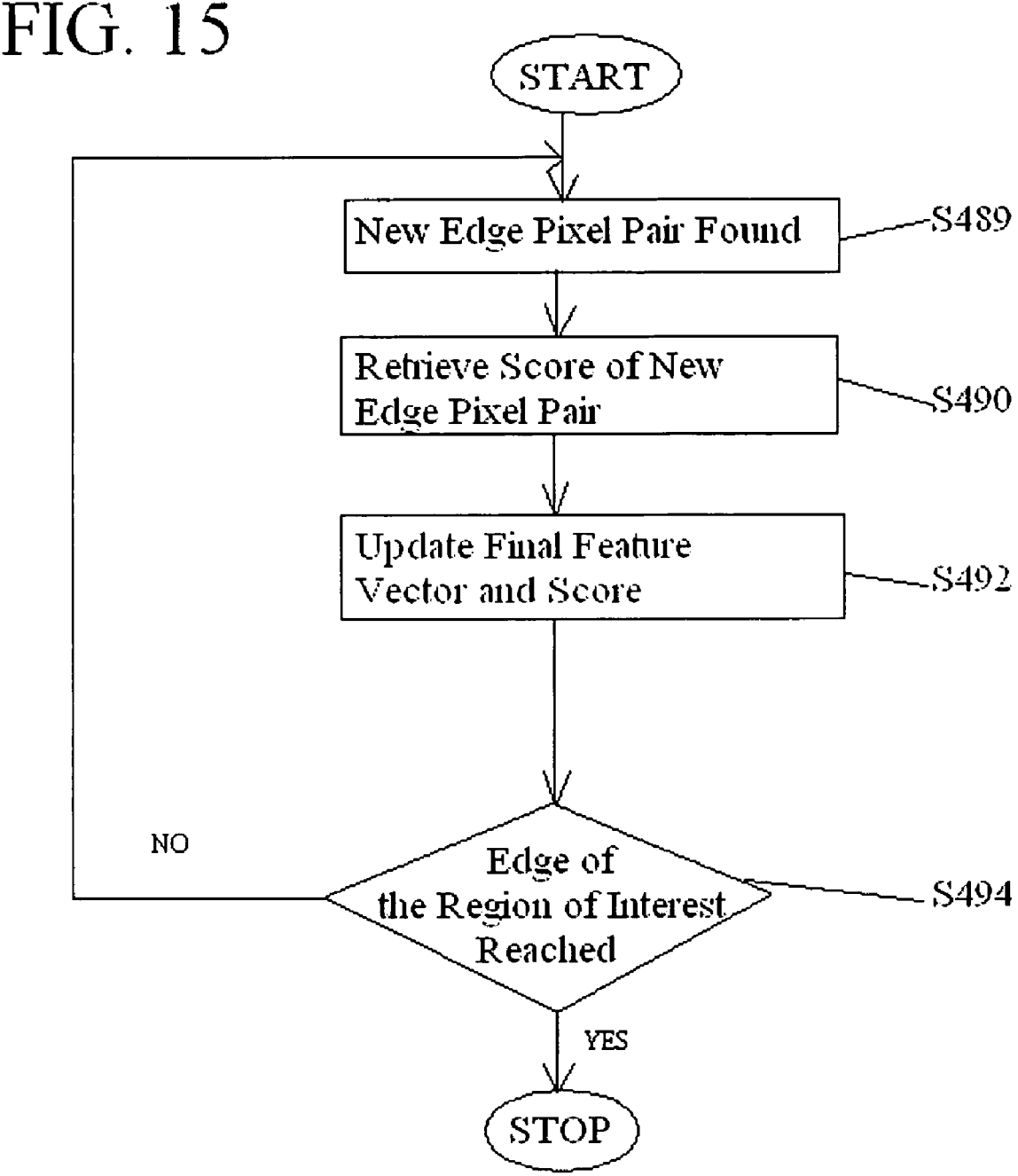
FIG. 15 is a flow diagram illustrating a technique for deriving a final score from tracked edges of vessels in an image containing vessels according to an embodiment of the present invention.

FIG. 15 is a flow diagram illustrating a technique for deriving a final score for a region of interest containing vessels according to an embodiment of the present invention. Each individual score (S490) calculated for a pixel pair during the edge tracking operation updates a final feature vector (S492). Additional measures pertinent to the tracking process, such as curvature, length and principal components can be incorporated into the final feature vector. When the edge of the region of interest is reached (S494), the final feature vector is complete with score information from all edge pixel pairs and the final feature vector score for the region of interest is output.

Figure 16:
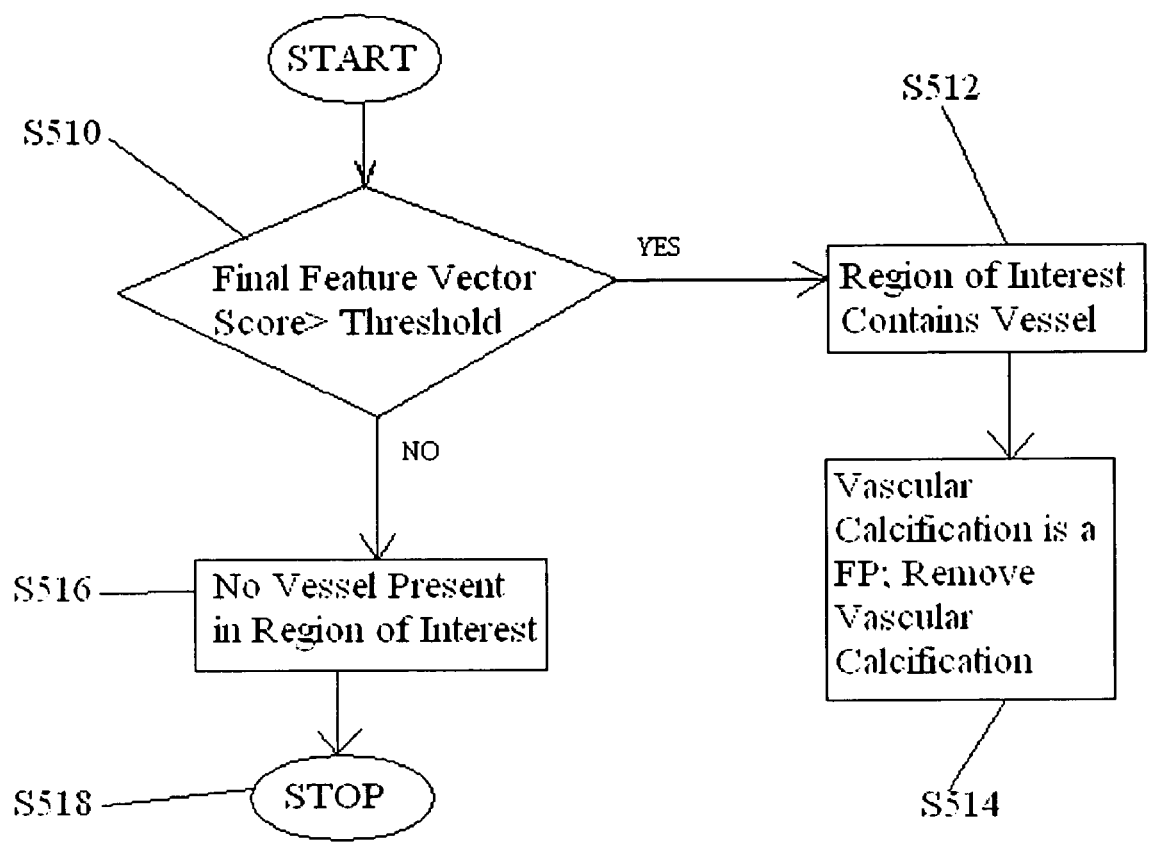
FIG. 16 is a flow diagram illustrating aspects of the classification process for identifying the image as vascular according to an embodiment of the present invention.

FIG. 16 is a flow diagram illustrating aspects of the vessel identification process based on final feature vector score according to an embodiment of the present invention. The final feature vector of the region of interest is input into a support vector machine vessel classifier. The support vector machine vessel classifier returns a prediction value based on the feature vector. If the prediction value is greater than a given threshold (S510), the set of edge pixel pairs that generated the final feature vector score delineate a vessel (S512). The region of interest is therefore vascular. A vascular calcification region is a false positive, and it is removed (S514). If the prediction value is smaller than a given threshold (S510), the pixel pairs that generated the final feature vector score did not in fact belong to a vessel (S516). The vessel detection algorithm stops, and the region of interest must be sent to other modules for further investigation (S518).

Figure 17A:
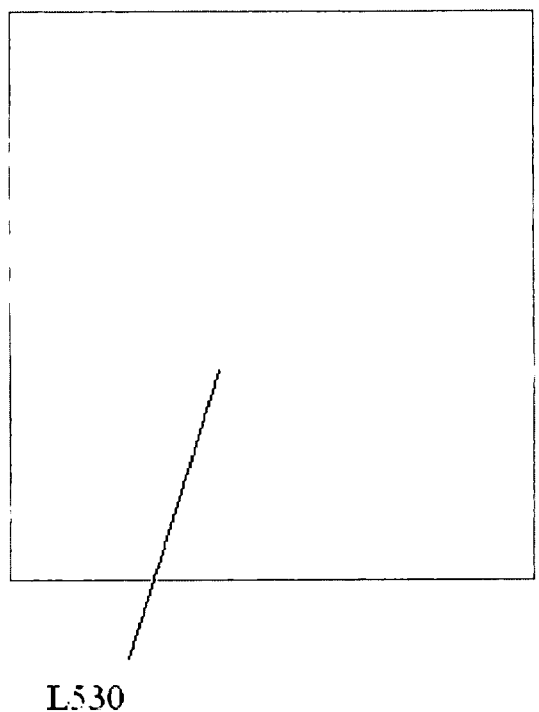
FIG. 17A-FIG. 17B illustrate an exemplary input and output of the vessel detection module according to an embodiment of the present invention.
Figure 17B:
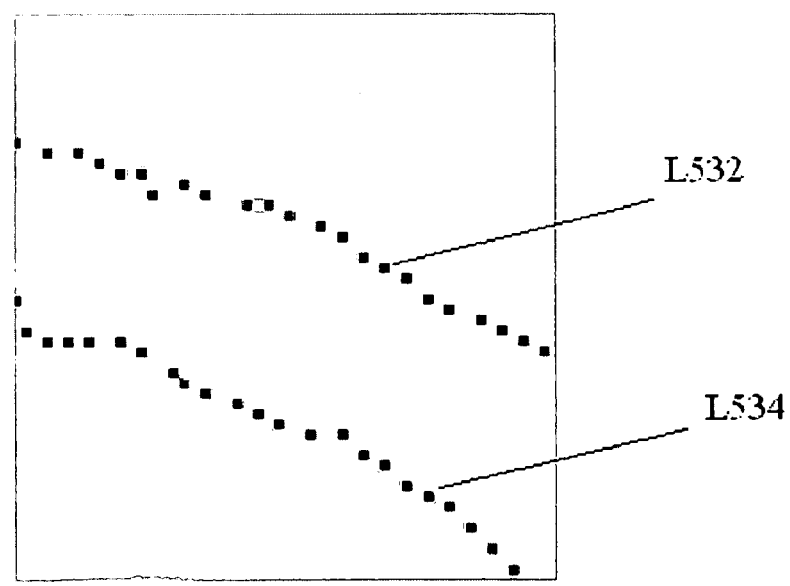

FIG. 17A-FIG. 17B illustrate an exemplary output of the vessel detection module 38, according to an embodiment of the present invention. Continuously updated tracked edges identify the meandering vessel in the image (L530). Lines L532 and L534 are tracked edges of vessel L530.

Although detailed embodiments and implementations of the present invention have been described above, it should be apparent that various modifications are possible without departing from the spirit and scope of the present invention.

We claim:

1. A method of automatically detecting vessels in a diagnostic image, said method comprising:
   accessing digital image data representing a diagnostic image; and
   detecting vessel candidates in said diagnostic image by processing said digital image data, said step of detecting vessel candidates including
   identifying edge pixel pairs of vessels in said diagnostic image by iteratively adjusting a plurality of constraints relating to a general direction and shape of a vessel for a next iteration of edge pixel pair identification in said diagnostic image, and determining whether the plurality of said edge pixel pairs form a vessel using features learned from previous data.

2. The method for automatically detecting vessels in a diagnostic image as recited in claim 1, wherein said step of detecting vessel candidates includes creating a map of said diagnostic image.

3. The method for automatically detecting vessels in a diagnostic image as recited in claim 2, wherein said step of creating a map of said diagnostic image includes creating a binary edge map.

4. The method of automatically detecting vessels in a diagnostic image as recited in claim 3, said step of creating a binary edge map further comprising:
generating an image of edge magnitudes, and
removing isolated edges from said image of edge magnitudes.

5. The method for automatically detecting vessels in a diagnostic image as recited in claim 1, wherein said step of detecting vessel candidates includes testing whether significant edge structure exists in said diagnostic image.

6. The method for automatically detecting vessels in a diagnostic image as recited in claim 2, further comprising:
testing whether significant edge structure exists in said map of said diagnostic image.

7. The method for automatically detecting vessels in a diagnostic image as recited in claim 6, wherein said step of testing whether significant edge structure exists in said map of said diagnostic image includes
dividing said map into regions of interest of fixed size, and
locating significant edge structure in each region of interest of fixed size based on a connectivity parameter.

8. The method of automatically detecting vessels in a diagnostic image as recited in claim 1, wherein said step of identifying edge pixel pairs of vessels in said diagnostic image includes:
iteratively determining the next edge pixel pairs, once two edge pixel pairs are found, without a priori assumptions on direction and shape of vessels, and
using a weight based scoring mechanism to find the next edge pixel pair using the last two edge pixel pairs, where weights are assigned to characteristics of edge pixel pairs including at least one of:
i) gradient magnitudes;
ii) distance between pixels in said edge pixel pairs;
iii) connectivity;
iv) linearity; and
v) directional gradient.

9. The method of automatically detecting vessels in a diagnostic image as recited in claim 1, further comprising:
identifying the best edge pixel pair that fits a set of constraints about the vessel structure and direction;
determining a second best pair using a connectivity constraint to said best edge pixel pair; and
iteratively determining the next edge pixel pair onwards from previous pairs and learned characteristics of vessels.

10. The method for automatically detecting vessels in a diagnostic image as recited in claim 1, further comprising:
determining whether said vessel candidates are vessels from learned features.

11. The method for automatically detecting vessels in a diagnostic image as recited in claim 1, further comprising:
determining whether said diagnostic image is a vascular calcification image.

12. An apparatus for automatically detecting vessels in a diagnostic image, said apparatus comprising:
an image data unit for providing digital image data representing a diagnostic image; and
a vessel candidate detecting unit for detecting vessel candidates in said diagnostic image by processing said digital image data, said vessel candidate detecting unit detecting vessel candidates by
identifying edge pixel pairs of vessels in said diagnostic image by iteratively adjusting a plurality of constraints relating to a general direction and shape of a vessel for a next iteration of edge pixel pair identification in said diagnostic image, and
determining whether the plurality of said edge pixel pairs form a vessel, using features learned from previous data.

13. The apparatus according to claim 12, wherein said vessel candidate detection unit includes a map detection unit creating a map of said diagnostic image.

14. The apparatus according to claim 13, wherein said map detection unit includes a binary edge map detection unit.

15. The apparatus according to claim 14, wherein said binary edge map detection unit performs binary edge detection by:
generating an image of edge magnitudes, and
removing isolated edges from said image of edge magnitudes.

16. The apparatus according to claim 12, further comprising:
a support vector machine classifier unit for testing whether significant edge structure exists in said diagnostic image.

17. The apparatus according to claim 13, further comprising:
a support vector machine classifier unit for testing whether significant edge structure exists in said map of said diagnostic image.

18. The apparatus according to claim 17, wherein said support vector machine classifier unit performs classification by
dividing said map into regions of interest of fixed size, and
locating significant edge structure in each region of interest of fixed size based on a connectivity parameter.

19. The apparatus according to claim 12, wherein said vessel candidate detecting unit identifies edge pixel pairs of vessels in said diagnostic by
iteratively determining the next edge pixel pairs, once two edge pixel pairs are found, without a priori assumptions on direction and shape of vessels, and
using a weight based scoring mechanism to find the next edge pixel pair using the last two edge pixel pairs, where weights are assigned to characteristics of edge pixel pairs including at least one of:
vi) gradient magnitudes;
vii) distance between pixels in said edge pixel pairs;
viii) connectivity;
ix) linearity; and
x) directional gradient.

20. The apparatus according to claim 12, wherein said vessel candidate detecting unit identifies edge pixel pairs of vessels in said diagnostic by
identifying the best edge pixel pair that fits a set of constraints about the vessel structure and direction;
determining a second best pair using a connectivity constraint to said best edge pixel pair; and iteratively determining the next edge pixel pair onwards from previous pairs and learned characteristics of vessels.

21. The apparatus according to claim 12, further comprising:
a support vector machine classifier unit for determining whether said vessel candidates are vessels from learned features.

22. The apparatus according to claim 12, wherein said vessel candidate detection unit decides whether said diagnostic image is a vascular calcification image.

\* \* \* \* \*